March 7, 1961 D. A. WALES 2,974,277
MAGNETIC FIELD SENSING DEVICE
Filed Dec. 16, 1958

INVENTOR
DONALD A. WALES
BY Williamson, Schroeder & Palmatier
ATTORNEYS

United States Patent Office 2,974,277
Patented Mar. 7, 1961

2,974,277
MAGNETIC FIELD SENSING DEVICE

Donald A. Wales, Minneapolis, Minn., assignor to Maico Electronics, Inc., Minneapolis,, Minn., a corporation of Minnesota Filed Dec. 16, 1958, Ser. No. 780,723

5 Claims. (Cl. 324—43)

This invention relates to a magnetic field sensing device and more particularly relates to a sensing head and the electrical circuitry therefor.

An object of my invention is to provide a new and improved magnetic field sensing device of simple and inexpensive construction and operation.

Another object of my invention is the provision of a novel magnetic field sensing devices constructed in such a manner as to make the maximum utilization of the magnetic flux presented, and thereby permit the sensing device to be widely spaced from the source of the magnetic field being sensed.

A further object of my invention is the provision of an improved and novel polarity-sensitive magnetic field sensing device which is constructed in such a fashion as to permit ready and easy reversing for sensing fields of opposite polarities.

A still further object of my invention is to provide a new and novel magnetic field sensing device which has a high sampling rate to facilitate sampling of a large number of magnetic fields in a short interval of time so as to permit accurate identification of units of materials being carried along conveyors and the like.

A still further object of my invention is the provision of a new magnetic field sensing device including a sensing head and electrical circuitry used in connection with the operation thereof, which are of such a nature as to materially reduce susceptibility to electrical interference, and also constructed to permit a limited tolerance in the frequency of the excitation current applied to the sensing head, without causing any appreciable distortion in the operation of the sensing device at the output thereof.

Still another object of my invention is the provision of a magnetic field sensing device which eliminates the need for reliance upon relative motion between the magnetic field being sensed and the sensing device and further incorporates a sensing head with all the components thereof completely enclosed or embedded in such a manner as to substantially eliminate the effect of ambient temperatures on the head components and so as to permit the head to operate within the desired ranges without overheating or causing other deleterious effects, and thereby cause the electrical components of the head to be protected against physical damage.

These and other objects and advantages of my invention will more fully appear from the following description made in connection with the accompanying drawings wherein like reference characters refer to the same or similar parts throughout the several views and in which.

Figure 1:
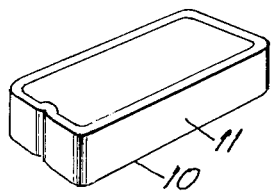
Fig. 1 is a perspective view of the sensing head of the magnetic field sensing device.

The present invention has been employed in connection with identifying material units such as carts, bulk-material bins, or individual units of material moving along a conveyor system which may move at rates of speed of one hundred twenty feet per minute and upwardly so as to produce a certain response when the material unit passes a predetermined location. These usages should not be construed as limiting but are only cited as being exemplary of applications of the present invention.

In order to sense the presence of a magnetic field in proximity with the sensing head, the magnetic field sensing device includes in the sensing head a low reluctance core upon which a pair of coils are wound in such a fashion as to cause, when positive and negative current pulses are respectively conducted thereby, flux in the same direction around the core. An oscillator is connected to corresponding ends of both coils and the coils are also connected to oppositely arranged diodes which permit positive and negative current pulses to be passed through the coils. The magnitudes of the current pulses are then equalized and then passed into a filter network and to a load resistor. When a magnetic field is brought into proximity with the sensing head and the field is oriented generally longitudinally of the head and coils, one of the coils will conduct more than the other of the coils, and the pulses of current of one polarity will have a substantially greater magnitude as they are applied to the filter than the current pulses of opposite polarity. The voltage across the load resistor will thereby be changed. The voltage across the load resistor may then be used to trigger operation of a predetermined-voltage-responsive device. A number of heads may be used in a bank with their corresponding detector circuits and in connection with an "and" circuit so as to necessitate that a plurality of magnetic fields of particular polarity be sensed in order to produce an operation of the predetermined-voltage-responsive device.

More specifically, the sensing head 10 of the magnetic field sensing device has a housing or open-topped shell 11 formed with a detent or notch 12 in one end thereof so that the relative positions of the parts in the head may be easily checked in relation to the polarity of the magnetic field to be sensed. The housing 11 may have a pair of cross ribs or webs 13 on the inner side thereof and upstanding from the bottom 14 thereof slightly and a plurality of symmetrically arranged sleeves or bosses 15, 16 and 17 may be molded integrally with the housing 11. The head 10 includes a core 18 which may be constructed of Mu Metal, which is approximately 78% nickel, 4% copper, less than 1% chromium, and the remainder iron. It will be seen that the low reluctance core 18 is constructed in the form of an elongated strip which is bent into a closed, oblong-shaped loop with substantially parallel and linear side portions 18a and 18b respectively, and the ends 19 of the strip are lapped with each other and welded together. The core 18 rests upon the ribs 13 and encloses the terminal mounting sleeves 15, 16 and 17.

A pair of coils 20 and 21 are wound on the opposite sides 18a and 18b of the core, and may be insulated from the core by short lengths 22 of dielectric tape on the core. The coils 20 and 21 are wound, from the input ends 20a and 21a thereof to the other ends 20b and 21b in substantial identical manners so as to reduce the distributive capacities between the core and coils, and also in such a manner as to cause, when positive and negative pulses of current are respectively carried by the coils, the flux produced by both the coils to be in the same direction around the core.

By way of example, the core may have an overall length of approximately 1.25 inches and a width of approximately .500 inch, and the core, in cross section may be approximately 0.020 x 0.090 inches. The coils 20 and 21 may each include 1500 turns of No. 43 wire. As for the actual winding of the coils, both of the coils 20 and 21 are wound on the core prior to the bending of the core into the oblong closed loop shape; and in the winding operation, one end 19 is first inserted into a rotary chuck and the coil 20 is wound with the end 20a being the "start" end of the winding and the end 20b being the "finish" end of the winding; similarly, the other end 19 of the core is inserted into the rotatable chuck and with the core being turned in the same direction as previously, the end 21a is the "start" end of the winding and end 21b is the "finish" end of the winding.

All of the mounting terminals are substantially identical and include a socket 22 affixed in the corresponding mounting sleeve 15, 16 or 17. The sockets 22 are adapted to receive similarly positioned plugs 23 which are fixed to a suitable mounting panel 24 for carrying the head 10. Each of the sockets 22 has a post insert 25, and applied on certain of these post inserts are wire-mounting eyelets 26 which are generally sleeve-shaped with a flange 26a at one end thereof, which is soldered at 27 to the end of the socket 22. The eyelets 26 and the solder 27 secure the respective ends of the coils to the head-mounting socket terminals 22.

Figure 2:
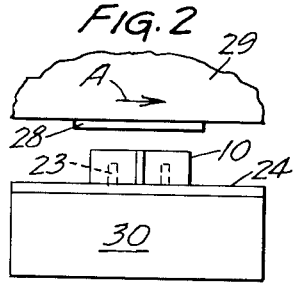
Fig. 2 is a top plan view of the head mounted on a suitable mounting panel and shown in association with a moving magnetized tab which is to be sensed.
Figure 3:
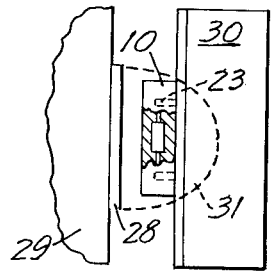
Fig. 3 is a side elevation of the apparatus shown in Fig. 2 with the head being partly broken and shown in section for displaying a portion of the core and coils.
Figure 4:
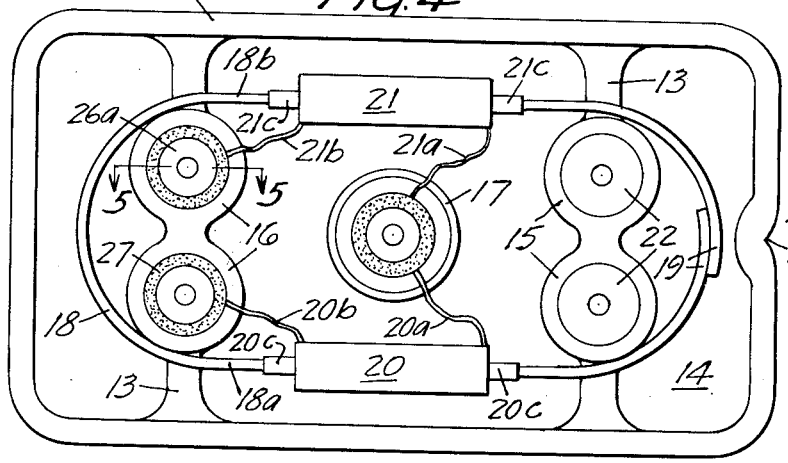
Fig. 4 is an enlarged front elevation view of the head and being shown with the potting material removed so as to clearly disclose the construction and arrangement of the core and coils and mounting terminals.
Figure 5:
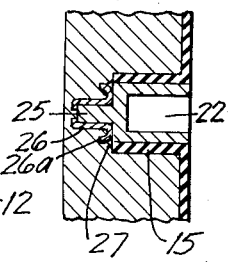
Fig. 5 is a detail section view taken on a line as indicated at 5—5 in Fig. 4.

In Figs. 2 and 3 will be seen the preferred relationship between the sensing head 10 and the means defining the magnetic field to be sensed, which, in the form shown comprises a magnetized tab 28 which is affixed to a moving device such as a conveyed unit of material 29 so that when the unit 29 passes the stationary structure 30 upon which the head 10 is mounted along with the plate 24, the sensing head will sense the existence of the magnetic field of tab 28 in proximity with the head 10.

The relative size of the head and core should be noted. It has been found that the core should be roughly two to three times as long as the spacing between the tab 28 and the head 10, in order to make the fullest use of the magnetic field. The effective bounds of this field are indicated by means of a dotted line in Fig. 3 and numeral 31. The spacing between the opposite sides of the core 18a and 18b should be mentioned at this point. It will be noted that the opposite sides of the core are spaced sufficiently wide apart as to permit the provision of smoothly rounded ends in the oblong-shaped core so as to permit the sides to be integral with each other, and having only one weld at one end. The opposite sides of the cores should on the other hand be positioned as close together as is practical because as the tab 28 moves in the direction of arrow A past the head 10, the maximum effect of the magnetic field on each coil does not occur simultaneously, but occurs when the tab is slightly off center in one direction or the other with respect to the head. It is preferred to produce this maximum effect on the core at each coil in as nearly simultaneous relation as is possible, and with this in mind, the coils should be maintained as closely spaced as is practical.

Figure 6:
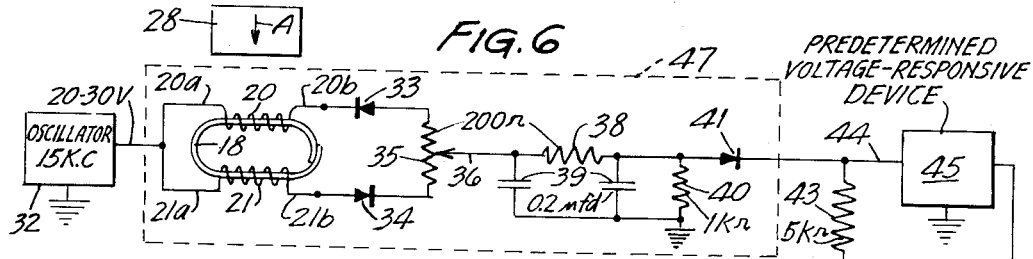
Fig. 6 is a schematic view of the magnetic field sensing device.

In Fig. 6 the schematic diagram of the magnetic field sensing device is shown. An oscillator or exciter 32 is connected to the common terminal for corresponding ends 20a and 21a of the coils 20 and 21 and the other ends 20b and 21b of the coils are respectively connected through their corresponding terminals to diodes 33 and 34 which are arranged oppositely with respect to each other in the circuit so as to permit the coils 20 and 21 to carry current pulses of opposite polarity with respect to each other, one of the coils carrying only positive pulses and the other coil carrying only negative pulses. A potentiometer 35 is connected across the diodes 33 and 34 and the center tap 35 of the potentiometer is normally adjusted so that the current pulses at the center tap are of substantially equal magnitude with respect to each other in absence of an external magnetic field. The center tap 36 is connected to the input of a current-filtering network 37, which employs a resistor 38 and a pair of condensers 39 respectively connected to the opposite ends of resistor 38 and to ground. A load resistor 40 is connected at the output of the filtering network and another diode 41 is also provided in series with the filtering network 37 at the output thereof. A D.C. source of voltage 42 is connected through a voltage-dropping resistor 43 to the diode 41 and also to the control lead 44 of a device 45 which is set into operation when a predetermined voltage is applied at the control lead 44. The device 45 may be provided with the power from the D.C. source 42 through a conductor 46.

In Fig. 6, typical values of the several circuit components are shown. Particular note is directed to the frequency of the oscillator 32 which supplies current to the head at approximately 15 kilocycles. This frequency has been found to be extremely satisfactory for use in installations of the sensing device wherein the spacing between the head 10 and the magnetized tab is approximately three-eights to one-half inch, when the tab is in directly confronting relation with the head. It has been found however, that with the device shown, the precise frequency of the oscillator or exciter 32 is not extremely critical, and it is believed that this is as a result of the balanced circuit connected with the head and the balanced stray reactances thereof which tend to reduce the frequency sensitivity, and is further as a result of the balanced distributive capacities from the coils to the core in the head due to the identical winding of the two coils from the ends 20a and 21a thereof to the other ends. It should further be noted that the head has a low operating impedance, of approximately 600 ohms.

In the operation of the sensing device shown in Fig. 6, as the tab 28 moves past the sensing head, the magnetic field of the tab will cause a flux change in the core 18 and will cause a sharp decrease of current flowing in one of the coils and will permit the current in the other coil to increase substantially. As a result, the current pulses of one polarity will have a substantially greater magnitude at the center tap 36 than the current pulses of the other magnitude and the filtering network 37 will filter these current pulses and produce a change in the D.C. voltage across the load resistor 40. It will be recognized that if the magnetic field of the tab 28 has one polarity, the voltage at the resistor 40 will increase, and if the magnetic field of the tab 28 has the opposite polarity, the voltage at the load resistor 40 will decrease. However, because of the diode 41, the voltage at the control lead 44 will change materially in only one direction, thus making the magnetic field sensing device sensitive to the polarity of the field of tab 28. If it is desired to sense a field of one polarity the head 10 is oriented in one direction, and if the magnetic fields of opposite polarity are to be sensed, the head will be reversed on its mounting terminal post 23 without changing the electrical connections. It will therefore be seen that the symmetrical arrangement of the mounting terminals of the head is important in order to permit this reversing so as to change the polarity of the magnetic field to which the device will be sensitive. The notch 12 in the end of the head 10 is provided for easily checking the actual installed position of the head against the polarity of the field to be sensed.

It should further be noted that when the tab 28 has passed by the sensing head 10, the output from the head returns to its normal condition and the magnitudes of the positive and negative current pulses are substantially equal or balanced with respect to each other at the center tap 36 of the potentiometer 35 so that there is substantially no current output from the filter network 37 when no magnetic field is being sensed by the head.

With the circuit arranged as shown in Fig. 6, the predetermined voltage-responsive device will operate when the voltage at the control lead 44 is driven slightly positive in response to the sensing of a magnetic field of predetermined polarity.

Figure 7:
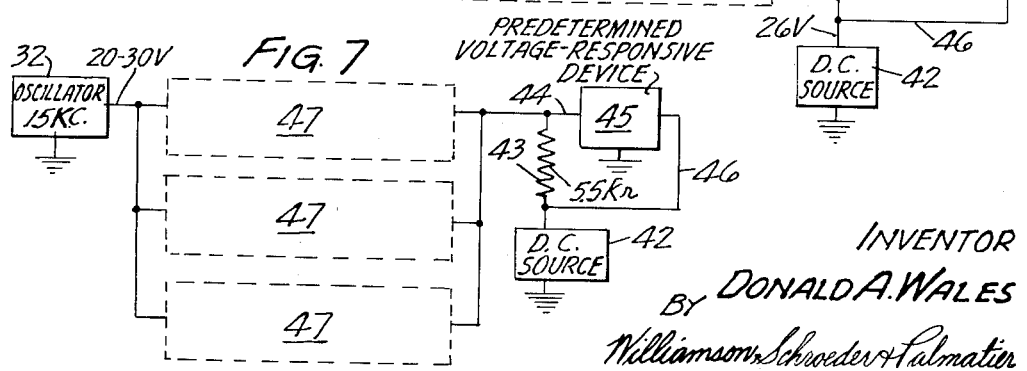
Fig. 7 is a slightly modified application of the device shown in Fig. 6.

In Fig. 7, it is shown that a single oscillator may supply a plurality of circuits 47 which are outlined by dotted lines and which are identical to the circuit enclosed within the dotted line of Fig. 6. The remainder of the circuit is substantially identical except that the output from each of the circuits 47 is connected to the control lead 44 of the predetermined voltage-responsive device 45. With the arrangement of Fig. 7, a plurality of sensing heads must all sense magnetic fields of predetermined and proper polarities in order to cause the change in the voltage at lead 44 in order to cause the device 45 to operate. This circuit arrangement facilitates complex coding of the arrangement of the magnetic fields of the tabs and of the heads so that unless a predetermined code arrangement is read by the sensing heads, the device 45 will not operate.

It will be seen that I have provided a new and improved magnetic field sensing device employing a sensing head wherein no pole pieces, laminations, feed back windings, or special handling of the core is required or necessary. It will further be seen that the sensing device is polarity sensitive and is easily reversible for changing the polarity sensitivity, and further the spacing between the device carrying the magnetic field and the head for sensing the field may be quite substantial so as to permit the use of magnetic identification of units of material and the like in situations where the linear travel of a conveyed medium may also have a limited amount of sideway.

It will, of course, be understood that various changes may be made in the form, detail, arrangement and proportion of the parts without departing from the scope of my invention which consists of the matter described herein and set forth in the appended claims.

What is claimed is:

1. In a magnetic field sensing device, a sensing head comprising a low reluctance core forming a closed oblong shaped loop having elongate opposite sides, a pair of coils each wound on a respective side of the core and each having first and second ends disposed opposite the corresponding ends of the other coil, a first head mounting terminal positioned at the center of the core loop and connected with the first ends of the coils, a plurality of second head mounting terminals positioned in symmetrical arrangement about said first mounting terminal to permit 180° physical reversing of the position of the head, the second ends of said coils being connected to a pair of said second terminals, and a mounting for said core and said terminals.

2. A magnetic field sensing device comprising a sensing head for sensing the field and having a low reluctance core forming a closed loop and having opposite sides each having a coil wound thereon, an alternating current source, said coils having first ends coupled with said source, and said coils also having second ends respectively connected to oppositely arranged diodes respectively conducting positive and negative current pulses, resistance means connected across the diodes and having an adjustable tap to normally equalize the magnitudes of and to carry said positive and negative current pulses, the coils being wound in such a direction to produce flux in similar directions in the core upon conduction of positive and negative current pulses respectively, and means connected to said tap to produce an output signal in response to a comparison of magnitudes of successive current pulses conducted by said tap, whereby the presence of the magnetic field adjacent the core will vary the relative magnitudes of the current pulses conducted by the coils and will thereby cause a change in the output signal.

3. A magnetic field sensing device comprising a sensing head for sensing the field and having a low reluctance core forming a closed loop having opposite sides each with a coil wound thereon, an alternating current source, said coils having first ends coupled with said source, said coils also having second ends respectively connected to oppositely arranged diodes which alternately conduct positive and negative current pulses, means interconnected with both diodes to provide a common output for positive and negative current pulses, the coils being wound in such a manner as to produce flux in similar directions in the core upon conduction of positive and negative current pulses respectively, and means connected to the common output to produce an output signal in response to a comparison of magnitudes of successive current pulses conducted by the common output, whereby the presence of a magnetic field adjacent the core will vary the relative magnitudes of current pulses conducted by the coils and will thereby cause a change in the output signal.

4. A magnetic field sensing device comprising a sensing head for sensing the field and having a low reluctance core forming a closed loop with opposite sides each having a coil thereon, an alternating current source, said coils having first ends coupled with said current source, and said coils also having second ends respectively connected to oppositely arranged diodes respectively and alternately conducting positive and negative current pulses, means interconnected with both diodes to provide a common output for positive and negative current pulses, the coils being wound on the core in such a manner as to produce flux in similar directions in the core upon conduction of positive and negative current pulses respectively, and means connected to the output to produce a signal in response to high magnitude current pulses of one polarity, whereby the output signal will indicate the presence of a magnetic field of a particular polarity adjacent the sensing head.

5. A magnetic field sensing device, comprising a sensing head for sensing the field and having a low reluctance core forming a closed loop with elongate opposite sides each having a coil wound thereon, an alternating current source, said coils having first ends coupled with said current source, and said coils also having second ends respectively connected to oppositely arranged diodes respectively conducting positive and negative current pulses, means interconnected with both diodes to provide a common output for positive and negative current pulses, the coils being wound on the core in such a manner as to produce flux in similar directions in the core upon conduction of positive and negative current pulses respectively, and current filtering means connected with the common output and including a load resistance across which the filtered current produces an output signal, whereby the existence of a magnetic field adjacent the sensing head and oriented longitudinally of the sides of the core produces a change in the output signal.

References Cited in the file of this patent

UNITED STATES PATENTS

| | | |
|---|---|---|
| 708,220 | Gill | Sept. 2, 1902 |
| 1,449,871 | Pratt | Mar. 27, 1923 |
| 2,581,209 | Shepard et al. | Jan. 1, 1952 |
| 2,594,332 | McKee et al. | Apr. 29, 1952 |
| 2,649,568 | Felch et al. | Aug. 18, 1953 |

FOREIGN PATENTS

| | | |
|---|---|---|
| 460,290 | Italy | Nov. 13, 1958 |